(12) United States Patent
Franz

(10) Patent No.: US 10,596,985 B2
(45) Date of Patent: Mar. 24, 2020

(54) OPERATING METHOD FOR A FILTER SYSTEM AND FILTER SYSTEM

(71) Applicant: MANN+HUMMEL GmbH, Ludwigsburg (DE)

(72) Inventor: Andreas Franz, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 90 days.

(21) Appl. No.: 15/690,741

(22) Filed: Aug. 30, 2017

(65) Prior Publication Data

US 2018/0056899 A1    Mar. 1, 2018

(30) Foreign Application Priority Data

Aug. 30, 2016   (DE) .................... 10 2016 010 394

(51) Int. Cl.
*B60R 16/02*     (2006.01)
*B60R 16/023*    (2006.01)
(Continued)

(52) U.S. Cl.
CPC .......... *B60R 16/0234* (2013.01); *B01D 35/14* (2013.01); *B01D 46/009* (2013.01);
(Continued)

(58) Field of Classification Search
CPC .. B60R 16/0234; B01D 35/14; B01D 46/009; B01D 46/429; B01D 2273/18; B01D 2201/54; B01D 2201/56; B01D 2201/52; G07C 5/085; G07C 5/008; G06K 7/10366; F02M 37/22; F02M 35/02; F01P 11/14; F01P 11/12; F01N 11/00; F01M 11/03
See application file for complete search history.

(56) References Cited

U.S. PATENT DOCUMENTS 5,674,381 A     10/1997  Den Dekker
2011/0220560 A1  9/2011  Verdegan et al.
(Continued)

FOREIGN PATENT DOCUMENTS

DE   10 151 270 A1    5/2003
DE   102010044258 A1  5/2011
(Continued)

OTHER PUBLICATIONS

Techopedia "Application-Specific Integrated Circuit (ASIC)" retrieved Jan. 13, 2012. (see attached PDF version).*
English translation of JP 2008025234 (see attached PDF).*

*Primary Examiner* — Nadeem Odeh
*Assistant Examiner* — Michael V Kerrigan
(74) *Attorney, Agent, or Firm* — James Hasselbeck

(57) ABSTRACT

A filter system for a motor vehicle, such as a car, truck, train, ship includes a filter element for a fluid filter with a wireless identification means having second data about the filter element. A filter housing for the fluid filter in which the filter element is exchangeably arranged and which has a read device for the wireless identification means. A central data base in which third data about the filter element is stored. An evaluation unit configured to retrieve the third data about the filter element from the central data base and to compare them to the second data about the filter element that were obtained from the read device.

11 Claims, 3 Drawing Sheets

(51) Int. Cl.
*B01D 46/42* (2006.01)
*B01D 35/14* (2006.01)
*B01D 46/00* (2006.01)
*G06K 7/10* (2006.01)
*G07C 5/00* (2006.01)
*G07C 5/08* (2006.01)

(52) U.S. Cl.
CPC ....... *B01D 46/429* (2013.01); *G06K 7/10366* (2013.01); *G07C 5/008* (2013.01); *G07C 5/085* (2013.01); *B01D 2201/52* (2013.01); *B01D 2201/54* (2013.01); *B01D 2201/56* (2013.01); *B01D 2273/18* (2013.01)

(56) References Cited

U.S. PATENT DOCUMENTS

| | | |
|---|---|---|
| 2013/0015109 A1 | 1/2013 | Holzmann |
| 2013/0180898 A1 | 7/2013 | Cajec |
| 2015/0360671 A1* | 12/2015 | Williams .............. B60T 13/746 701/70 |

FOREIGN PATENT DOCUMENTS

| | | | |
|---|---|---|---|
| EP | 1985351 A1 | 10/2008 | |
| JP | 2008025234 | * 2/2008 | ................ E02F 9/20 |

* cited by examiner

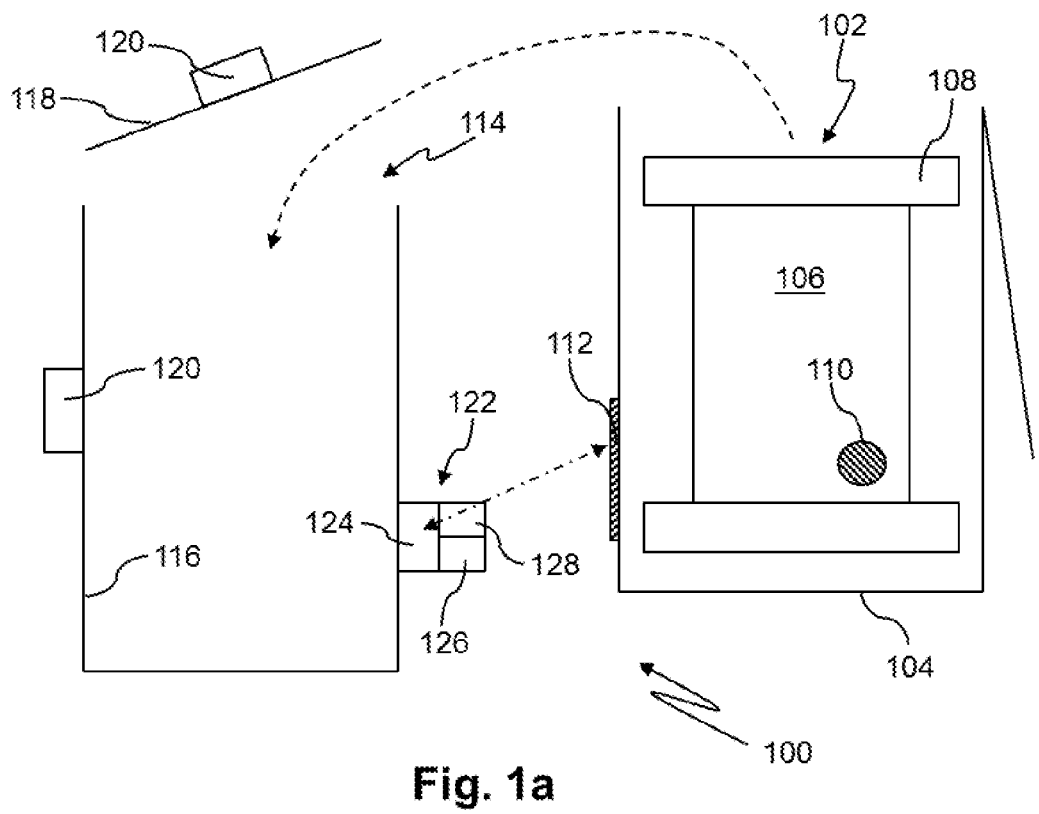
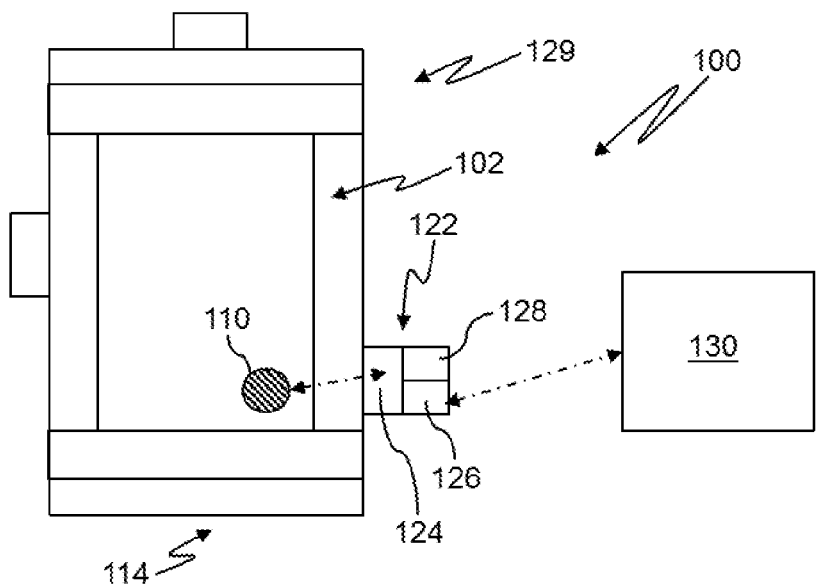
Fig. 1a
Fig. 1b

OPERATING METHOD FOR A FILTER SYSTEM AND FILTER SYSTEM

TECHNICAL FIELD

The invention relates to an operating method for a filter system, especially of a motor vehicle, wherein the filter system comprises the following:
a filter element for a fluid filter, wherein the filter element has a wireless identification means;
a filter housing for the fluid filter in which the filter element may be exchangeably arranged and which has a read device for the wireless identification means;
an evaluation unit and a memory unit.

The invention furthermore relates to a filter system comprising a filter element having a wireless identification means, a filter housing in which the filter element may be exchangeably arranged and which has a reading device for the wireless identification means, and an evaluation unit.

BACKGROUND

Known from EP 1 985 351 A1 is a filter device for insertion in a motor vehicle having a filter element and a filter housing. The filter element is equipped with an RFID chip and a read device for reading out the RFID chip is arranged in the filter housing to make it possible to test and identify the filter insert when installed.

DE 10 2010 044 258 B4 discloses a filter device comprising a filter element having an RFID chip for insertion into a housing having a contacting component. When the filter element is installed in the housing, the contacting component communicates with the RFID chip. In this way it may be determined whether a filter element is inserted at all and/or whether the correct filter element is inserted.

The filter devices described in the foregoing do not offer sufficient protection against the insertion of filter elements that are not approved for the filter device, for instance counterfeit filter elements or filter elements from a different manufacturer that may not perform adequately. In the prior art, testing of the filter element may be cancelled in that RFID chips are removed from original filter elements and reused, or in that data retrieved from original chips are provided on an RFID chip of a copy of the filter element that has the same shape but may be of lower quality. In critical applications, this may in particular be associated with hazards.

SUMMARY

It is therefore an object of the invention to provide an operating method for a filter system and a filter system with which it may be reliably assured that only suitable filter elements provided for the filter system are used.

The inventive operating method is suitable in particular for the filter system of a motor vehicle, an aircraft, or even of a ship. The filter system filters a fluid, especially fuel, oil, water, or air. The filter system comprises a filter element for a fluid filter of the filter system. The filter element is provided in packaging. The packaging is provided with first data about the filter element. The first data of the packaging may be provided on the packaging itself or on/in a package insert, for instance, printed or stored on an electronic storage medium. The filter element has a wireless identification means with second data about the filter element. The first and second data may be completely or partially identical. The first and second data may contain information about the filter element in coded form. In particular, different codes may be used for the same information for the first and second data.

The first and/or second data may include in particular a serial number, preferably one individual serial number, a type designator, a date of manufacture, an expiration date, a maximum operating time for the filter element, and/or data for identifying motor vehicles in which the filter element may be used. The filter system furthermore comprises a filter housing for the fluid filter. The filter element is exchangeably arranged in the filter housing. The filter housing has a read device for the wireless identification means. The second data of the wireless identification means may be retrieved with the read device when the filter element is installed in the filter housing. The filter system furthermore comprises an evaluation unit and a memory unit. The memory unit and the evaluation unit may be provided as one common unit, such as a computer based unit, or separately from one another. In a step a) of the inventive operating method, the filter element is inserted into the filter housing. Also in step a), the first data are imported into the memory unit from the packaging of the filter element. Thus, this in particular stores in the memory unit which filter element (identifiable for instance using a serial number) should be installed in the filter housing. In a step b), the read device retrieves the second data of the wireless identification means. The second data that are retrieved may also be stored in the memory unit. Then, in a step c), the first data and the second data are compared to one another in the evaluation unit. Furthermore in step c), a warning is output and/or operation of the fluid filter is prevented if the result of the comparison is that the second data of the wireless identification means do not match the first data from the packaging in a prescribed manner.

Steps b) and c) are executed at least once following step a), in particular immediately following step a). They are preferably repeated multiple times to check whether a different filter element has been installed in the meantime. During the comparison, it may be checked whether the first data and the second data are identical matches, i.e. whether the first data and the second data contain, for instance, the same serial number for the filter element. A match may also be confirmed in a different prescribed manner, without the data being identical matches. For instance, the first data may include information that the filter element must come from a specific production lot or must have been manufactured in a certain time period. Corresponding information are then contained in, or may be taken from, the second data. For instance, it may be possible to reconstruct the production lot and date of manufacture from the serial number of the filter element.

The warning is typically output directly in/on the motor vehicle provided with the filter system. The warning may also be output at a central location, for instance at a workshop or at a manufacturer of the filter system or of the motor vehicle having the filter system. To this end, the results of the comparison from step c) may be transmitted in a manner known in and of itself (e.g. by means of telemetry) and/or may be stored (e.g. in an error memory of the motor vehicle). Comparing the first data and the second data ensures that wireless identification means from filter elements that have already been used are not reused and that data retrieved from original wireless identification means are provided in an identical form on a wireless identification means of a reproduction filter element. That is, according to the invention it is necessary for corresponding first data to be provided, as well. In this way, the logistics overhead for (unallowed) reproduction of the filter element is significantly increased. First data and/or second data may include a key that is unique for each filter element in order to unlock stored encrypted second data or first data. The key contained in first data of the packaging is then required to decrypt the second data of the wireless identification means for the filter element, and/or vice versa. In this way, it is possible even more reliably to prevent getting around (circumventing) the comparison in step c).

Steps b) and c) are advantageously executed after a start-up of a motor vehicle having the filter system, preferably after every start-up of a motor vehicle having the filter system. This ensures that the comparison is executed repeatedly during the service life of the filter element. It may be recognized whether, after a period of time, an original filter element has been replaced by a reproduction filter element, the second data of which do not match the first data of the packaging in the prescribed manner. Starting up the motor vehicle shall be construed to mean in particular turning on the ignition and so-called "booting" (=booting up) a control device. Steps b) and c) are preferably executed even before an internal combustion engine starts running or shortly (a few seconds) thereafter.

Steps b) and c) are advantageously executed every time the filter housing is opened and closed. This means that it is always possible to detect exchange of the filter element. It may be advantageously provided that first data imported from the packaging must also be imported after the filter housing has been opened and closed. The filter housing may have sensors for detecting opening and closing. Opening and closing is preferably reported to the evaluation unit or a control device, after which steps b) and c) are executed automatically.

In step c), explained in the foregoing, there may also be a check to determine whether an expiration date for the filter element has passed. If this is the case, a warning is output and/or (further) operation of the fluid filter is prevented. This can force exchange intervals for the filter element to be maintained. The expiration date may be determined proceeding from a date of manufacture or may be prespecified. According to the invention, the expiration date may also be determined proceeding from the date of initial operation, which may be established using step a), with a maximum operating time for the filter element. Date of manufacture and/or maximum operating time may be included in the first data and/or in the second data. A current date may be made available in a manner known per se, e.g. in a control device of a motor vehicle having the filter system or via radio signals/wireless signals.

According to the invention, the filter system may also comprise a central data base. Third data about the filter element may be stored in the data base. In step b), furthermore, the third data about the filter element may be retrieved from the central data base and/or the second data are transmitted to the central data base. The third data in step c) are typically compared to the first data and/or to the second data. This permits the use of additional information in the comparison in step c). The third data may include information that may be uniquely associated with the second data, for instance a prespecified expiration date for all filter elements of a specific production lot. The size (memory requirement) of the two data may be reduced in this manner. The first data may be transmitted to the central data base in step a). If the second data are transmitted to the data base, additional checks or evaluations may be executed there. The central data base is set up outside of the vehicle, typically for a number of motor vehicles from the same manufacturer or having filter systems of the same type. It is understood that the data base may preferably be in the form of software or a data base application installed on a computer, especially a server, which may be located remotely from the filter system and may communicate with the filter system over a wireless or wired network.

It is particularly preferred that the wireless identification means is an RFID tag (RFD chip). A sufficient amount of second data may be stored in one RFID tag. In addition, an RFID tag does not require a discrete power supply. Retrieving with the read device may occur in a contactless manner.

The wireless identification means may be arranged on or in a filter medium of the filter element, in particular inside the filter medium. Alternatively, the wireless identification means may be arranged on or in an end disk of the filter element or on or in a sealing element of the filter element. In particular, the wireless identification means may be embedded in, cast into, overmolded on, or injected into the end disk or the sealing element.

According to the invention, the evaluation unit and/or the memory unit may be embodied in the read device. The read device then typically comprises a CPU having programming as evaluation unit and a memory region that acts as the memory unit. The memory unit may be embodied in any known form, for instance as a solid state disc (SSD).

The evaluation unit and/or the memory unit may be embodied in one control device of the motor vehicle. The control device typically already comprises a CPU and a memory region that are/may be appropriately set up according to the invention.

The first data of the packaging for the filter element may be stored in another wireless identification means, in particular in another RFID tag, in a barcode, or in a smart code. The filter system comprises a suitable read device or such a device may be connected to the filter system. Another wireless identification means may be read out on the filter housing in particular by means of the read device present.

A filter system, especially for a motor vehicle, is also within the scope of the present invention. The inventive filter system comprises a filter element for a fluid filter, wherein the filter element has a wireless identification means with two sets of data about the filter element. The filter system furthermore comprises a filter housing of the fluid filter in which the filter element is exchangeably arranged and which has a reading device for the wireless identification means. Therefore, the second data of the wireless identification means may be retrieved with the read device if the filter element is inserted in the filter housing. Furthermore, the filter system comprises a central data base in which third data about the filter element may be stored. Finally, the filter system comprises an evaluation unit that is set up to retrieve the third data about the filter element from the data base and to compare them to the second data about the filter element that were obtained from the read device. Using the comparison it is possible to determine whether the second and third data match in a prescribed manner. In this way operation of the filter system with an unsuitable/unapproved or obsolete filter element may be detected. In particular information on approved types of filter elements for the motor vehicle may be stored in the data base. The evaluation unit is preferably furthermore set up to output a warning and/or to prevent operation of the fluid filter if the result of the comparison is that the second data of the wireless identification means do not match the third data from the data base in a prescribed manner. To retrieve the third data from the data base, the evaluation unit may transmit to the data base information relating to the filter element, filter system, and/or motor vehicle having the filter system. The central data base is set up outside of the vehicle, typically for a number of motor vehicles from the same manufacturer or having filter systems of the same type. The inventive filter system may be operated with an inventive operating method.

The filter system may furthermore comprise a memory unit in which data on the filter element may be stored. The data in the memory unit may first have been retrieved from the data base and/or relate to the operation of the filter element, for instance they may be a date of installation or operating time. The data from the memory unit may be considered during the comparison of the second and third data.

The evaluation unit is furthermore preferably set up to transmit data about the filter element to the data base. This permits additional checks or evaluations to be conducted. The data transmitted to the data base may include information on the operation of the filter element, for example an installation date or operating time. The transmitted data may also include all or some of the second data of the wireless identification means.

BRIEF DESCRIPTION OF THE DRAWINGS

The invention shall be explained in greater detail in the following using the exemplary embodiments depicted in the drawings.

The figures are as follows:

FIG. 1a is a highly schematic depiction of an inventive filter system having a filter housing and a filter element in a packaging;

FIG. 1b depicts the filter system from FIG. 1a, wherein the filter element is inserted into the filter housing;

DETAILED DESCRIPTION

Figure 2:
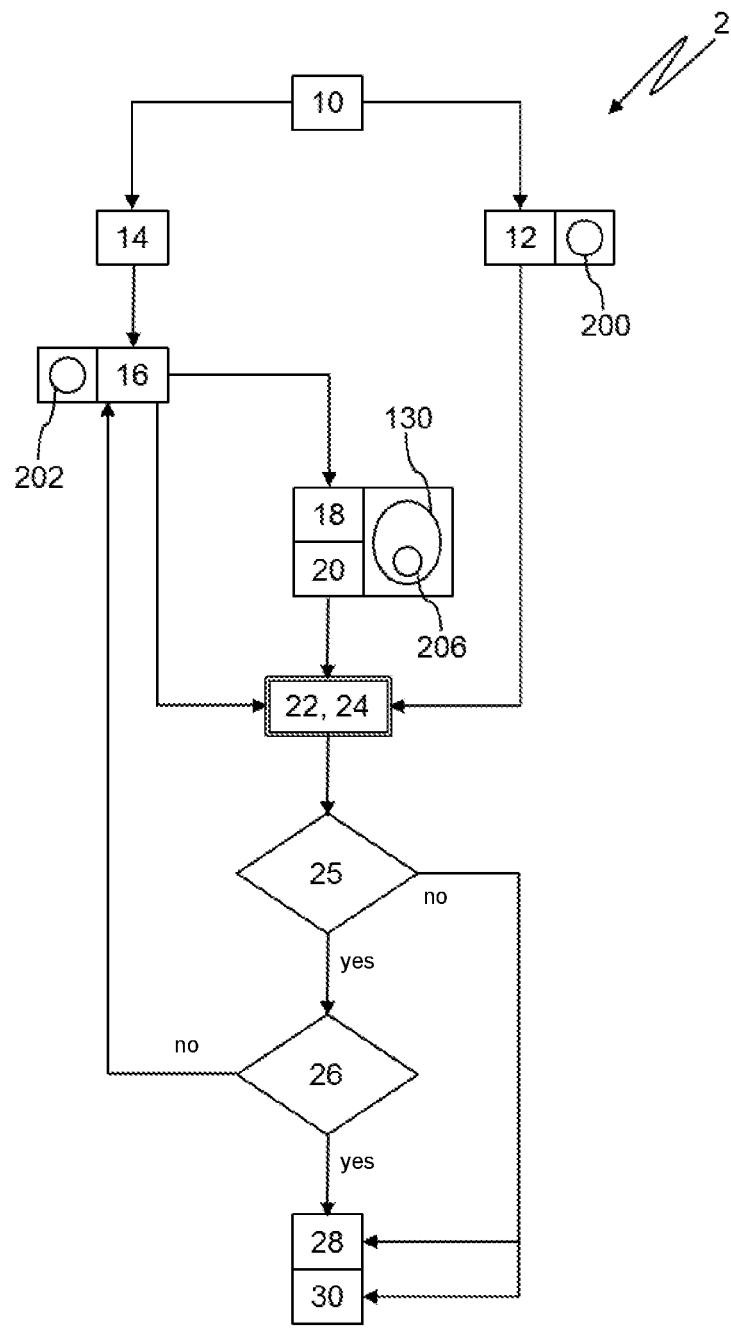
FIG. 2 is a schematic flow chart for an operating method according to the invention.

FIG. 1a is a highly schematic depiction of a filter system 100 according to the invention. The filter system 100 may be used in a motor vehicle (not shown), for instance. The filter system 100 has a filter element 102 that in this case is provided in packaging 104. The filter element 102 comprises a filter medium 106 and two end disks 108. In this case the filter element 102 is depicted, as an example, as a round filter element, having a star-shaped pleated filter medium 106 through which fluid flows radially. It is understood that filter elements having any structural shape may be used in the context of the invention. The filter element 102 has a wireless identification means 110. In this case, the wireless identification means 110 is an RFID tag (RFD chip). First data regarding the filter element 102 are stored in the wireless identification means 110.

The packaging 104 carries another wireless identification means 112. In this case the other wireless identification means 112 is embodied as an RFID tag attached to the packaging 104. Second data regarding the filter element 102 are stored in the other wireless identification means 112.

The filter system 100 furthermore comprises a filter housing 114 having a filter container 116 and a housing cover 118. In this case, embodied on the filter container 116 and housing cover 118 are a flow inlet and a flow outlet 120 for a fluid to be filtered. The filter housing has a read device 122 for the wireless identification means 110 of the filter element 102. As illustrated, the read device 122 may be arranged on the filter container 116 or alternatively on the housing cover 118. In this case the read device 122 comprises a read unit 124 and an evaluation unit 126 and a memory unit 128. Alternatively, the evaluation unit 126 and the memory unit 128 may also be embodied separately from (independent of) the read device 122, for instance in a control device of a motor vehicle having the filter system 100.

The other wireless identification means 112 of the packaging 104 may be read out by means of the read device 122. To this end, the other wireless identification means 112 may be moved towards the read unit 124, typically after the filter element 102 has been removed from the packaging 104. The first data of the packaging 104 detected by the read unit 124 are then stored in the memory unit 128 (see also FIG. 2).

FIG. 1b depicts a fluid filter 129 of the filter system 100 that is formed by the filter housing 114 having the filter element 102 inserted therein. The filter system 100 furthermore comprises a central data base 130 in which third data about the filter element 102 may be stored. While the filter system 100 is operating, the read unit 124 of the read device 122 detects the second data of the wireless identification means 110 of the filter element 102. In addition, the read device 122 may retrieve the third data from the central data base 130 via the evaluation unit 126. The first data may be compared by the evaluation unit 126 to the third data from the data base 130 and/or to the second data stored in the memory unit 128. The read device may be connected to the data base by cable or wirelessly to make it possible to transmit data between the read device and the data base.

Referring now to FIG. 2, the following describes the sequence of an inventive operating method 2 for the filter system 100.

The filter element 102 is provided in the packaging 104 in a step 10. Then the filter element 102 is removed from the packaging 104. The packaging 104 is provided with the first data 200 about the filter element 102, e.g. the number of a production lot. In a step 12, the first data 200 are imported into the memory unit 128 of the filter system 100.

In a step 14, the filter element 102, which has been removed from the packaging 104, is inserted into the filter housing 114. Once the filter element has been removed from the packaging 104 and inserted into the filter housing 114, the operating method continues with a testing method including the steps 16-30, as described below.

The filter element 102 is provided with the wireless identification means 110 on which the second data 202 about the filter element 102, e.g. a serial number, are stored. After the filter element 102 has been inserted 14 into the filter housing 114, the second data 202 are retrieved by the read device 122 of the filter housing 114 in a step 16.

In a step 18, the second data 202 may then be transmitted to the central data base 130, for instance in order to centrally register that this filter element 102 has been installed. Other data may also be transmitted to the data base 130, for instance, the motor vehicle model in which the filter element 102 has been installed. In a step 20, the third data 206 about the filter element 102 may be retrieved from the data base 130, for instance a maximum permissible operating time in the filter system 100 of the motor vehicle model in question.

Then, in a step 22, the first data 200 and the second data 202 are compared to one another in the evaluation unit 126 of the filter system 100. The comparison 22 may be made taking the third data 206 into consideration 24. In a step 25, using a result of the comparison 22, there is a check to determine whether the first data 200 and the second data 202 match in a prescribed manner. In particular, the third data 206 may be used to specify the prescribed manner for determining that there is a match. As an example, there may first be a test to determine whether the installed filter element 102 comes from the production lot that is indicated in the first data 200 of the packaging 104. Corresponding information may be taken from the serial number of the filter element 102 that was stored in the wireless identification means 110 as second data 202. Moreover, there may be a check of whether a type of the filter element 102 identifiable by the serial number may be operated in this motor vehicle model. There may furthermore be a check of whether the serial number of the installed filter element 102 still matches the serial number previously retrieved and stored in the memory unit 128 of the filter system 100 or central data base 130. The serial number of the installed filter element 102 may also be compared to a serial number previously imported 12 from the packaging 104 and stored in the memory unit 128.

If the check 25 of the result of the comparison 22 indicates that the first data 200 and second data 202 match in the prescribed manner, in a step 26 there may be a further check of whether the expiration date of the filter element 102 has passed. The expiration date may be included in the first data 200 and/or second data 202 as a specific date. The expiration date may also be determined proceeding from the date the filter element 102 is installed 14 across a maximum permissible operating time.

If the result of the comparison 22 indicates that the first data 200 and second data 202 do not match in the prescribed manner, or if the expiration date for the filter element 102 has passed, in a step 28 a warning is output and/or in a step 30 further operation of the fluid filter 129 is prevented. Whether the output 28 of a warning is sufficient or whether operation must be prevented 30 may be determined as a function of the result of the comparison 22 or the amount of time that has been determined to have passed since the expiration date in step 26. Thus, if not much time has passed since the expiration date (e.g. a few weeks), the output 28 of a warning is sufficient. But if it is determined during the check 25 of the result of the comparison 22 that a filter element has been installed that is not suitable for the filter system 100 (for instance, the wrong type of filter element or a reproduction filter element from a different manufacturer has been installed), further operation of the filter system 100s is prevented 30.

If, according to the results of the comparison 22, the correct filter element 102 has been installed and, according to a check 26 of the expiration date, may still be used, the method may be continued with re-retrieval 16 of the second data 202 from the wireless identification means 110. The re-retrieval 16 may occur, for instance, when the motor vehicle having the fluid filter 129 is actuated again (is started up) or if the filter housing 114 has been opened and closed.

Figure 3:
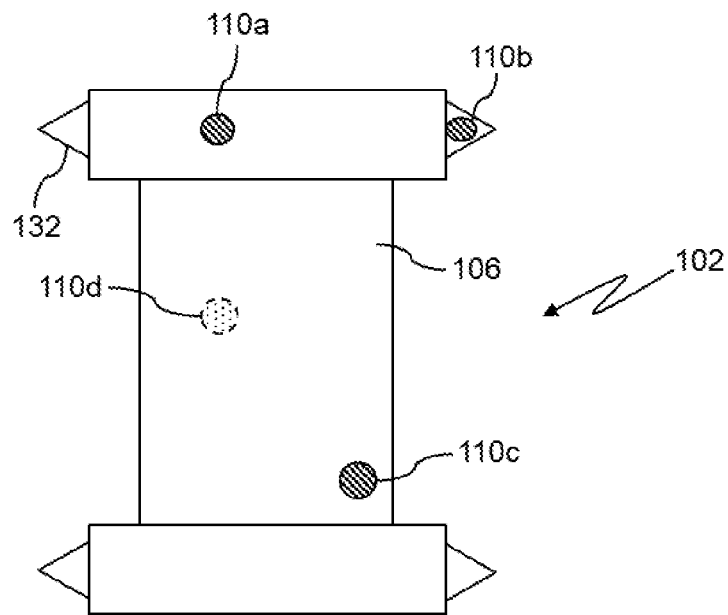
FIG. 3 is an extremely abstract depiction of different options for arranging a wireless identification means on the filter element in the context of the invention.

FIG. 3 depicts different exemplary positions at which a wireless identification means may be attached to the filter element 102. In this case, a first wireless identification means 110 is embedded (cast in) in an end disk 108 of the filter element 102. A second wireless identification means 110b may be integrated (e.g. injected) into a sealing element 132. The sealing element is arranged on the end disk 108 for sealing against a filter housing. A third wireless identification means 110c is arranged exteriorly on a filter medium 106 of the filter element 102, e.g. glued on. A fourth wireless identification means 110d is provided inside the filter medium 106. It is understood that typically only one of the wireless identification means 110a-d is arranged on the filter element, although in special cases it is also possible for a plurality of wireless identification means 110a-d to be present simultaneously.

Figure 4:
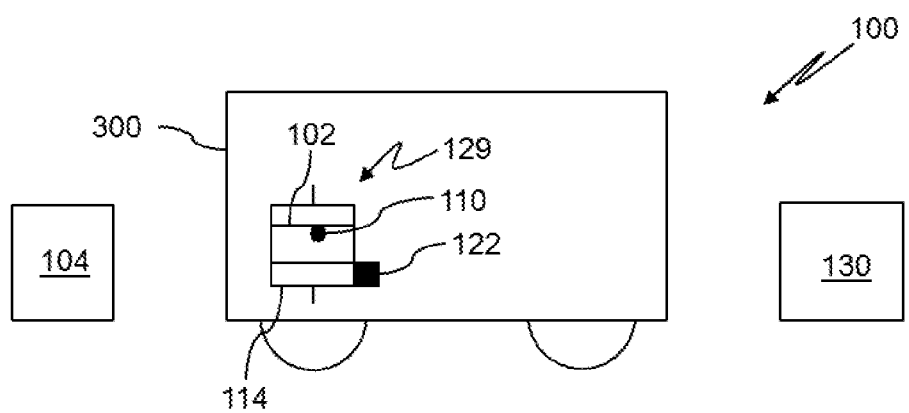
FIG. 4 depicts a motor vehicle having a filter system according to the invention.

FIG. 4 depicts an inventive filter system 100 having a fluid filter 129 that is installed in a motor vehicle 300. The fluid filter 129 has a filter element 102 with a wireless identification means 110 and has a filter housing 114 with a read device 122 for the wireless identification means 110. Packaging 104 in which the filter element 102 has been provided is disposed of following the installation of the filter element 102 into the filter housing 114 of the motor vehicle 300. Furthermore, the filter system may comprise a central data base 130.

What is claimed is:

1. An operating method for a filter system of a motor vehicle, wherein
   the filter system comprises:
      a filter element for a fluid filter,
         wherein the filter element has a packaging having a second wireless identification means having first data about the filter element, wherein the second wireless identification means is a radio frequency identification (RFID) tag or a barcode, and
         wherein the filter element has a first wireless identification means with second data about the filter element;
      a filter housing for the fluid filter in which the filter element is exchangeably arranged and which has a read device for reading the first wireless identification means and reading the second wireless identification means; and
      an evaluation unit and a memory unit;
   wherein the operating method comprises the steps of:
      providing the filter element with the packaging having the second wireless identification means;
      moving the second wireless identification means towards the read device;
      reading the first data about the filter element from the second wireless identification means and importing the first data into the memory unit;
      inserting the filter element into the filter housing;
      executing a testing method;
   wherein the testing method includes the steps of:
      retrieving the second data of the first wireless identification means with the read device from the filter element;
      comparing the first data and second data in the evaluation unit, producing a comparison result;
      when the comparison result is that the second data of the first wireless identification means do not match the first data from the packaging in a prescribed manner,
         then outputting a warning and/or preventing operation of the fluid filter;
   wherein the testing method further includes the steps of:
      determining if an expiration date for the filter element has passed;
      when the expiration date has passed then
         outputting a warning and/or preventing operation of the fluid filter.

2. The operating method according to claim 1, wherein before the step of executing a testing method, the operating method further includes the steps of:
   initiating starting the motor vehicle;
   waiting for the motor vehicle to start.

3. The operating method according to claim 1, further including the steps of:
  detecting if the filter housing has been opened and then closed;
  when the filter housing has been opened and then closed, then
    executing the testing method.

4. The operating method according to claim 1, wherein the filter system further comprises a central database;
  wherein the retrieving step of the testing method further includes
    retrieving third data about the filter element from the central database, and/or
    transmitting the second data to the central database.

5. The operating method according to claim 1, wherein the first wireless identification means of the filter element
  is an RFID tag having the second data about the filter element.

6. The operating method according to claim 1, wherein the first wireless identification means is arranged on or inside of a filter medium of the filter element.

7. The operating method according to claim 1, wherein the first wireless identification means is arranged on or in an end disk of a filter medium of the filter element, or on or in a sealing element of the filter element.

8. The operating method according to claim 1, wherein the evaluation unit and/or the memory unit are embodied in the read device.

9. The operating method according to claim 1, wherein the evaluation unit and/or the memory unit are embodied in a control device of a motor vehicle having the fluid filter for the filter system.

10. A filter system for a motor vehicle, comprising:
  a memory unit in which data on a filter element can be stored;
  a read device;
  the filter element being for a fluid filter, the filter element provided with a packaging for the filter element, the packaging with a second wireless identification means having a first data about the filter element, wherein the second wireless identification means is a radio frequency identification (RFID) tag or a barcode;
  wherein the read device wirelessly reads first data from the second identification means provided on the packaging of the filter element and imports the first data to the memory unit, wherein the first data includes data about the filter element including a number of a production lot of the filter element;
  wherein the filter element has a first wireless identification means having second data about the filter element, the second data including a serial number of the filter element, wherein the second data is retrieved by the read device from the filter element;
  a filter housing for the fluid filter in which the filter element is exchangeably arranged and which has the read device;
  a central database in which third data about the filter element is stored the third data including at least one of: motor vehicle model and maximum permissible operating time of the filter element; and
  an evaluation unit;
  wherein the evaluation unit is configured to retrieve the third data about the filter element from the central database and to compare them to the second data about the filter element that were obtained from the read device.

11. The filter system according to claim 10, wherein the evaluation unit is furthermore configured to transmit and store data about the filter element to the central database.

* * * * *